(12) United States Patent
Matsui et al.

(10) Patent No.: US 10,527,780 B2
(45) Date of Patent: Jan. 7, 2020

(54) ILLUMINATION APPARATUS, READING APPARATUS, AND PRINTING APPARATUS

(71) Applicant: CANON COMPONENTS, INC., Kodama-gun, Saitama-ken (JP)

(72) Inventors: Ryoki Matsui, Saitama-ken (JP); Suguru Tashiro, Saitama-ken (JP); Hidemasa Yosida, Saitama-ken (JP)

(73) Assignee: CANON COMPONENTS, INC., Saitama (JP)

( * ) Notice: Subject to any disclaimer, the term of this patent is extended or adjusted under 35 U.S.C. 154(b) by 0 days.

(21) Appl. No.: 16/123,286

(22) Filed: Sep. 6, 2018

(65) Prior Publication Data

US 2019/0072710 A1    Mar. 7, 2019

(30) Foreign Application Priority Data

Sep. 7, 2017 (JP) ................................ 2017-172406
Aug. 29, 2018 (JP) ................................ 2018-160580

(51) Int. Cl.
    *H04N 1/04*     (2006.01)
    *F21V 8/00*     (2006.01)
    (Continued)

(52) U.S. Cl.
    CPC ....... *G02B 6/0095* (2013.01); *G02B 27/0961* (2013.01); *H04N 1/0057* (2013.01); *H04N 1/00795* (2013.01)

(58) Field of Classification Search
    CPC .............. G02B 6/0095; G02B 27/0961; H04N 1/0057; H04N 1/00795
    (Continued)

(56) References Cited

U.S. PATENT DOCUMENTS

| | | | |
|---|---|---|---|
| 6,563,609 B1 * | 5/2003 | Hattori | ..................... G02B 3/02 |
| | | | 358/474 |
| 7,903,298 B2 * | 3/2011 | Sawada | ............. H01L 27/14629 |
| | | | 358/475 |

(Continued)

FOREIGN PATENT DOCUMENTS

JP      2014033440 A      2/2014

OTHER PUBLICATIONS

Copending U.S. Appl. No. 16/123,199 filed Sep. 6, 2018 (a copy is not included because the cited application is not yet available to the public and the Examiner has ready access to the cited application).

*Primary Examiner* — Cheukfan Lee
(74) *Attorney, Agent, or Firm* — Rossi, Kimms & McDowell LLP

(57) ABSTRACT

An illumination apparatus, comprising a light source unit, a rod-shaped light guide configured to guide light from the light source unit and emit the light from a light emitting surface, a covering member configured to contain the light guide, and a housing configured to contain the light source unit, the light guide, and the covering member, the light guide including a protruded portion configured to suppress a shift in a longitudinal direction, the covering member including an opening, and the housing including a receiving portion configured to receive the protruded portion of the light guide, wherein the protruded portion of the light guide is engaged with the receiving portion of the housing via the opening of the covering member.

5 Claims, 5 Drawing Sheets

(51) Int. Cl.
*H04N 1/00* (2006.01)
*G02B 27/09* (2006.01)

(58) Field of Classification Search
USPC ........................................ 358/475, 484, 509
See application file for complete search history.

(56) References Cited

U.S. PATENT DOCUMENTS

| | | | |
|---|---|---|---|
| 9,151,470 B2* | 10/2015 | Amemiya | F21V 13/04 |
| 9,207,376 B2 | 12/2015 | Yoshida | |
| 2003/0179420 A1* | 9/2003 | Fujino | H04N 1/02815 |
| | | | 358/484 |
| 2009/0003000 A1* | 1/2009 | Saito | G02B 6/003 |
| | | | 362/311.06 |
| 2009/0080213 A1* | 3/2009 | Onishi | G02B 6/001 |
| | | | 362/551 |
| 2009/0310190 A1* | 12/2009 | Ikeda | H04N 1/02815 |
| | | | 358/474 |
| 2011/0228353 A1* | 9/2011 | Okamoto | H04N 1/02815 |
| | | | 358/475 |
| 2012/0318961 A1* | 12/2012 | Sawada | H04N 1/0318 |
| | | | 250/208.1 |
| 2013/0265617 A1* | 10/2013 | Murakami | G02B 6/0001 |
| | | | 358/448 |
| 2014/0347884 A1* | 11/2014 | Fujiuchi | F21V 7/005 |
| | | | 362/609 |
| 2014/0355303 A1* | 12/2014 | Fujiuchi | H04N 1/02855 |
| | | | 362/611 |
| 2014/0374864 A1* | 12/2014 | Abe | H04N 1/02835 |
| | | | 257/432 |
| 2015/0062670 A1* | 3/2015 | Yoshida | G02B 6/0096 |
| | | | 358/482 |
| 2016/0238780 A1* | 8/2016 | Takamori | G02B 6/0088 |
| 2016/0301820 A1* | 10/2016 | Suto | H04N 1/02835 |
| 2017/0064125 A1* | 3/2017 | Tsumekawa | H04N 1/02855 |
| 2017/0295287 A1* | 10/2017 | Kiyota | H04N 1/00557 |
| 2019/0072711 A1* | 3/2019 | Matsui | G02B 6/0096 |
| 2019/0168525 A1* | 6/2019 | Yoshida | B41J 29/393 |

\* cited by examiner

ILLUMINATION APPARATUS, READING APPARATUS, AND PRINTING APPARATUS

BACKGROUND OF THE INVENTION

Field of the Invention

The present invention relates to an illumination apparatus, a reading apparatus, and a printing apparatus.

Description of the Related Art

A reading apparatus such as a scanner includes, for example, an illumination apparatus that irradiates an original with light and a light detection apparatus that detects light reflected by the original, and can thus read images (characters, graphics, photographs, and the like) on the original.

Some illumination apparatuses are formed by assembling, to a covering member, a rod-shaped light guide that guides light received from a light source unit such as an LED, and fixing the covering member to a housing (see Japanese Patent Laid-Open No. 2014-33440). The covering member is extended to expose, as a light emitting surface, part of a side surface of the light guide, and configured to reflect, toward the light emitting surface side, light from the light guide to the covering member.

In general, to maintain the reading accuracy of the reading apparatus, the light guide is preferably, appropriately fixed in the housing so its relative position with respect to each of other elements in the housing does not vary due to a vibration at the time of transportation or use. The same applies to the structure described in Japanese Patent Laid-Open No. 2014-33440.

SUMMARY OF THE INVENTION

The present invention provides a technique capable of preventing relative positional shifts among a light guide, a covering member, and a housing with a relatively simple arrangement.

One of the aspects of the present invention provides an illumination apparatus, comprising a light source unit, a rod-shaped light guide configured to guide light from the light source unit and emit the light from a light emitting surface, a covering member configured to contain the light guide, and a housing configured to contain the light source unit, the light guide, and the covering member, the light guide including a protruded portion configured to suppress a shift in a longitudinal direction, the covering member including an opening, and the housing including a receiving portion configured to receive the protruded portion of the light guide, wherein the protruded portion of the light guide is engaged with the receiving portion of the housing via the opening of the covering member.

Further features of the present invention will become apparent from the following description of exemplary embodiments with reference to the attached drawings.

DESCRIPTION OF THE EMBODIMENTS

Figure 1:
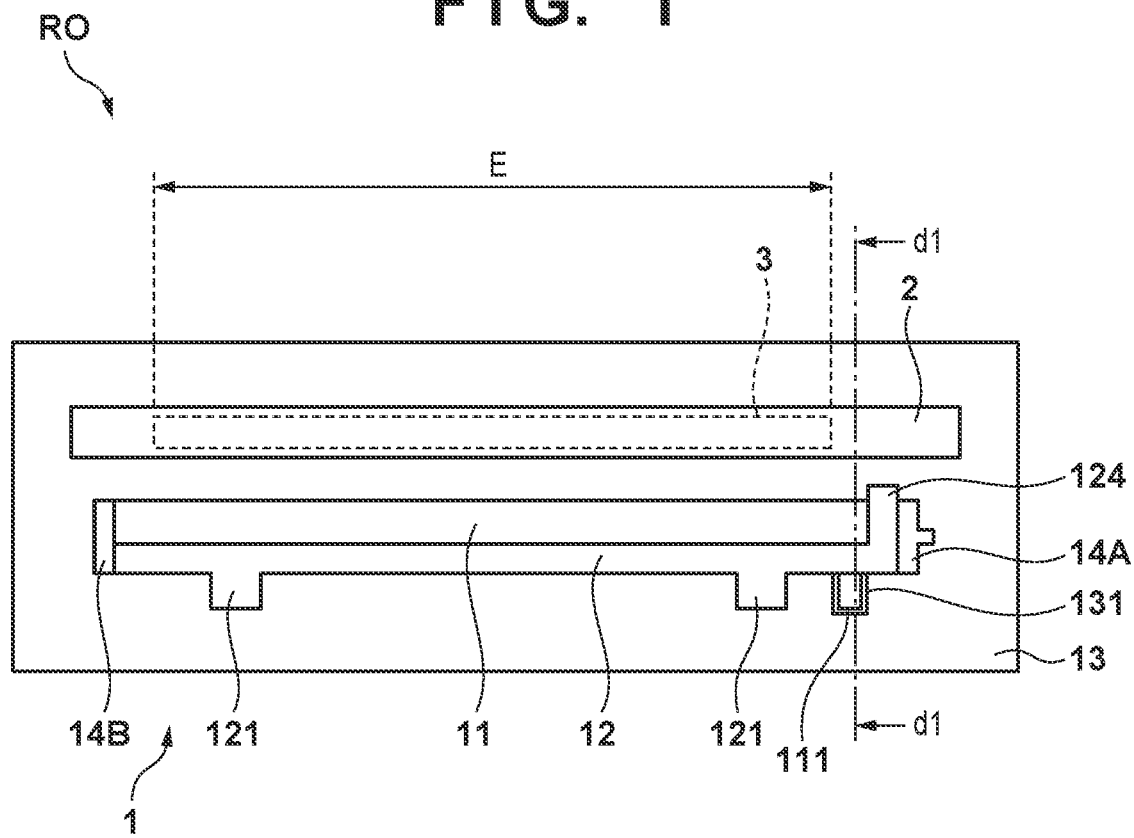
FIG. 1 is a plan view for explaining an example of the structure of a reading apparatus.
Figure 1:
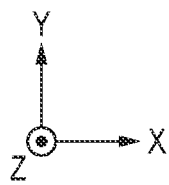

A preferred embodiment of the present invention will be described below with reference to the accompanying drawings. Note that each drawing is merely a schematic view drawn to exemplify a structure or arrangement, so the dimensions of each member shown in the drawing do not necessarily reflect the actual dimensions. Note also that the same reference numerals in these drawings denote the same members or the same constituent elements, and an explanation of the same contents will be omitted.

FIG. 1 is a plan view showing the structure of a reading apparatus RO according to the embodiment. For the sake of easy understanding of the structure, FIG. 1 shows X, Y, and Z directions intersecting each other or substantially orthogonal to each other (the same applies to the remaining drawings). The reading apparatus RO has an elongated structure extended in the X direction. The X direction may be represented as an extending, elongation, or longitudinal direction. The Y direction corresponds to the width direction of the reading apparatus RO. The Z direction corresponds to the height direction of the reading apparatus RO.

The reading apparatus RO includes an illumination apparatus 1, a rod lens array 2, and a line sensor 3. The illumination apparatus 1 includes a light guide 11, a covering member 12, a housing 13, and light source units 14A and 14B.

The light guide 11 is a rod-shaped member extended in the X direction. The light guide 11 receives light from each of the light source unit (first light source unit) 14A and the light source unit (second light source unit) 14B arranged in two end portions of the light guide 11, and guides the light in the X direction. As the light guide 11, for example, an optical fiber made of acryl or the like is used. Although described in detail later, each of the end face of the light guide 11 on the side of the light source unit 14A and the end face of the light guide 11 on the side of the light source unit 14B serves as a light incident surface.

The covering member 12 is extended in the X direction so as to expose some part of a side surface (a side surface extended in the X direction) of the light guide 11 and cover the remaining part, thereby fixing or supporting the light guide 11. Although described in detail later, the exposed part (exposed surface) of the side surface of the light guide 11 serves as a light emitting surface that emits light in the light guide 11.

The housing 13 fixes the covering member 12. Although described in detail later, the housing 13 contains the covering member 12 together with the light guide 11 and the light source units 14A and 14B.

The covering member 12 is formed by a member having relatively high light reflectance, such as a white member, so as to reflect the light from the light guide 11 toward the light emitting surface side. For example, polycarbonate doped with titanium oxide can be used for the covering member 12. On the other hand, the housing 13 is formed by a member having relatively high light absorptance, such as a black member, so as to absorb the light from the light guide 11. For example, polycarbonate containing glass fibers can be used for the housing 13. This can prevent leakage of the light from the light guide 11 to portions other than the light emitting surface and prevent stray light in the housing 13.

Figure 2:
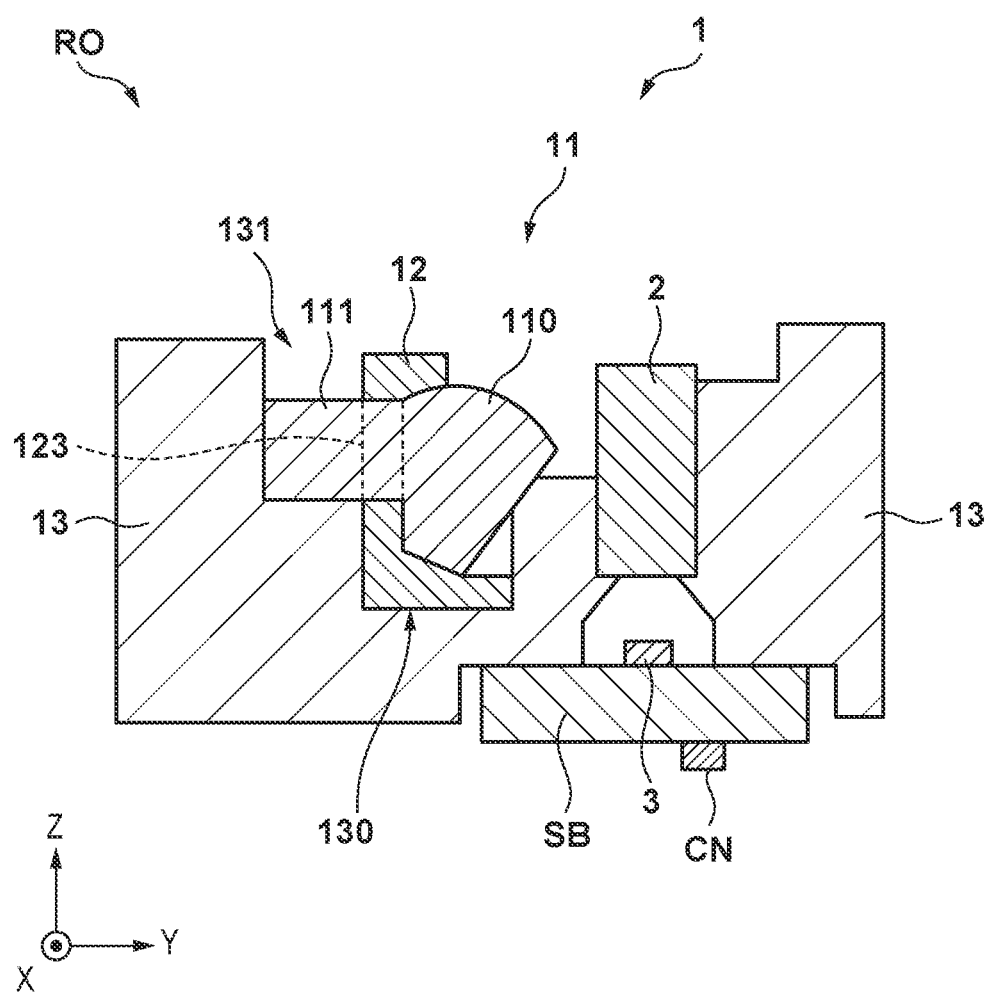
FIG. 2 is a sectional view for explaining the example of the structure of the reading apparatus.

FIG. 2 is a sectional view taken long a cut line d1-d1 of the reading apparatus RO. The rod lens array 2 is fixed to a position adjacent to the light guide 11 in the Y direction in the housing 13. The light emitted from the light guide 11 is reflected by a reading target object (not shown) above (on the +Z direction side) the reading apparatus RO, and the reflected light is condensed by the rod lens array 2 and guided downward (on the −Z direction side). Note that an example of the reading target object is a printing medium on which an image is formed, such as an original or a magazine.

The line sensor 3 is fixed below (on the −Z direction side) the rod lens array 2, and can detect the light condensed by the rod lens array 2. As the line sensor 3, a known photoelectric conversion element such as a CMOS image sensor is used. The line sensor 3 is implemented on the upper surface (a surface on the +Z direction side, an implementation surface) of a substrate SB, and the substrate SB is fixed to the housing 13. In this embodiment, an external communication connector CN is provided on the lower surface (a surface on the −Z direction side, a surface opposite to the implementation surface) of the substrate SB, and is used to output data or a signal corresponding to the light detection result of the line sensor 3.

Figure 3:
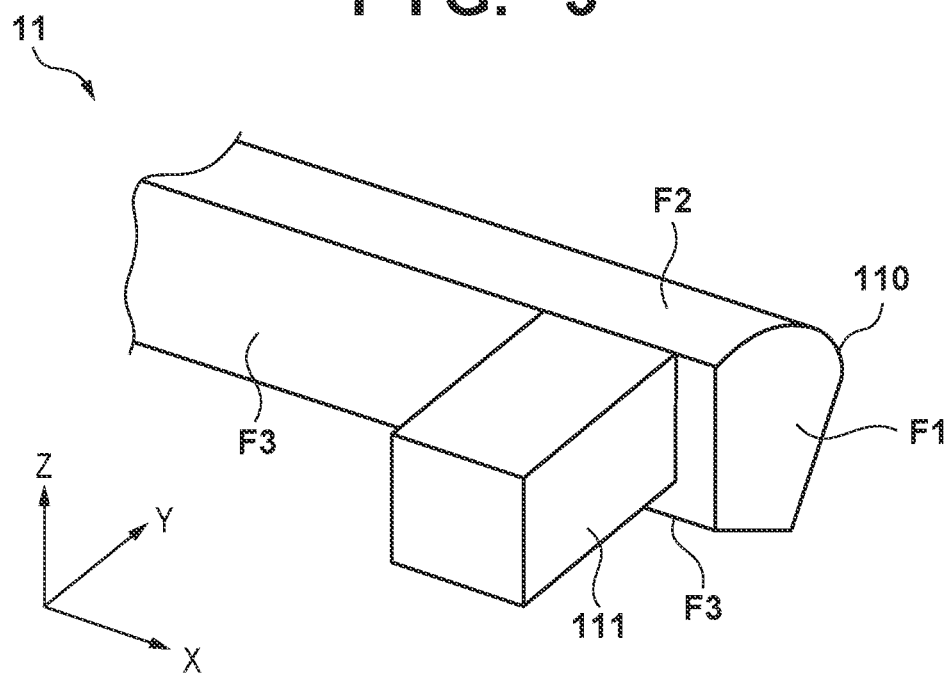
FIG. 3 is a perspective view for explaining an example of the structure of a light guide.

FIG. 3 is a perspective view showing the structure of the light guide 11, and an enlarged perspective view showing one end portion (an end portion on the +X direction side) of the light guide 11 on the side of the light source unit 14A. The light guide 11 includes a main body portion 110 and a protruded portion 111. The main body portion 110 is extended in the X direction, and functions as a propagation portion that mainly propagates light. The protruded portion 111 is a portion that protrudes (or extends) from the main body portion 110 in the −Y direction.

The light guide 11 includes the end face opposite to the light source unit 14A as a light incident surface F1, one side surface along the X direction as a light emitting surface F2, and the other side surface along the X direction as a light diffusing surface F3. For example, light entering the light incident surface F1 from the light source unit 14A passes through the main body portion 110, is reflected by the light diffusing surface F3 or the covering member 12 (not shown in FIG. 3), and is then emitted from the light emitting surface F2. The light diffusing surface F3 may be processed to reflect, toward the light emitting surface F2, part of the light passing through the main body portion 110. Note that in this embodiment, the above-described protruded portion 111 protrudes from the light diffusing surface F3 in the −Y direction in the one end portion of the light guide 11.

Although not shown in FIG. 3, the other end portion (the end portion on the −X direction side) of the light guide 11 on the side of the light source unit 14B includes, similarly to the light incident surface F1, an end face which the light from the light source unit 14B can enter, but no protruded portion 111 is provided in the other end portion.

The above-described substrate SB (see FIG. 2) is extended in the X direction. The above-described light source unit 14A is implemented in one end portion of the substrate SB and the above-described light source unit 14B is implemented in the other end portion of the substrate SB (note that the above-described line sensor 3 is implemented between the light source units 14A and 14B). In this embodiment, both the light source units 14A and 14B are packaged LED devices. The substrate SB is fixed to the housing 13 so that the light guide 11 is located between the light source units 14A and 14B and, more specifically, so that the LEDs (Light Emitting Diodes) as light emitting elements of the light source units 14A and 14B are located at positions overlapping the light incident surface F1 in the X direction.

Figure 4:
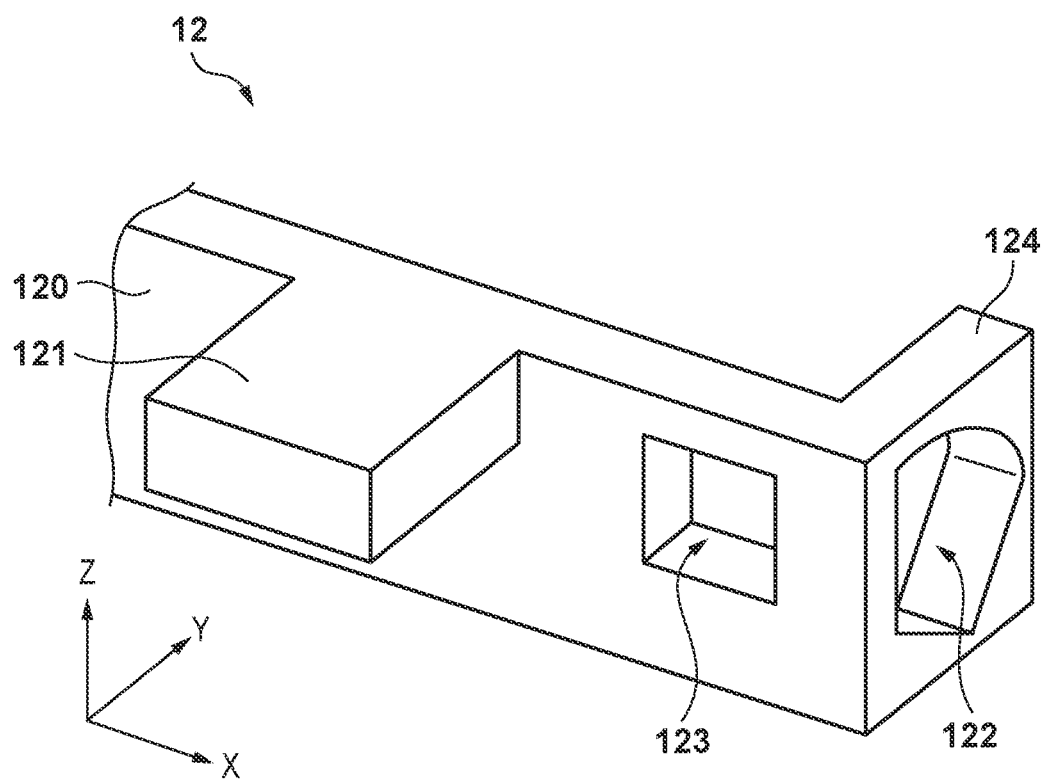
FIG. 4 is a perspective view for explaining an example of the structure of a covering member.

FIG. 4 is a perspective view showing the structure of the covering member 12, and an enlarged perspective view showing one end portion (an end portion on the +X direction side) of the covering member 12 on the side of the light source unit 14A. The covering member 12 includes a main body portion 120 and a holding portion 121. The main body portion 120 is extended in the X direction so as to cover the light diffusing surface F3 (see FIG. 3) of the light guide 11, and can reflect, toward the light guide 11, light leaking from the light guide 11. The holding portion 121 protrudes from the main body portion 120 in the −Y direction to be held. Although described in detail later, the holding portion 121 can be used to manufacture or fabricate the reading apparatus RO or the illumination apparatus 1.

The covering member 12 further includes openings 122 and 123. The opening 122 is formed, in the X direction, in a bent portion 124 that bends in an L shape in the one end portion of the covering member 12. As shown in FIG. 1, the light source unit 14A is fixed between the bent portion 124 and the housing 13, and the light from the light source unit 14A can pass through the opening 122 to enter the light incident surface F1 (see FIG. 3) of the light guide 11. Furthermore, the opening 123 is formed, in the Y direction, in a portion in the main body portion 120 between the holding portion 121 and the bent portion 124.

Figure 5:
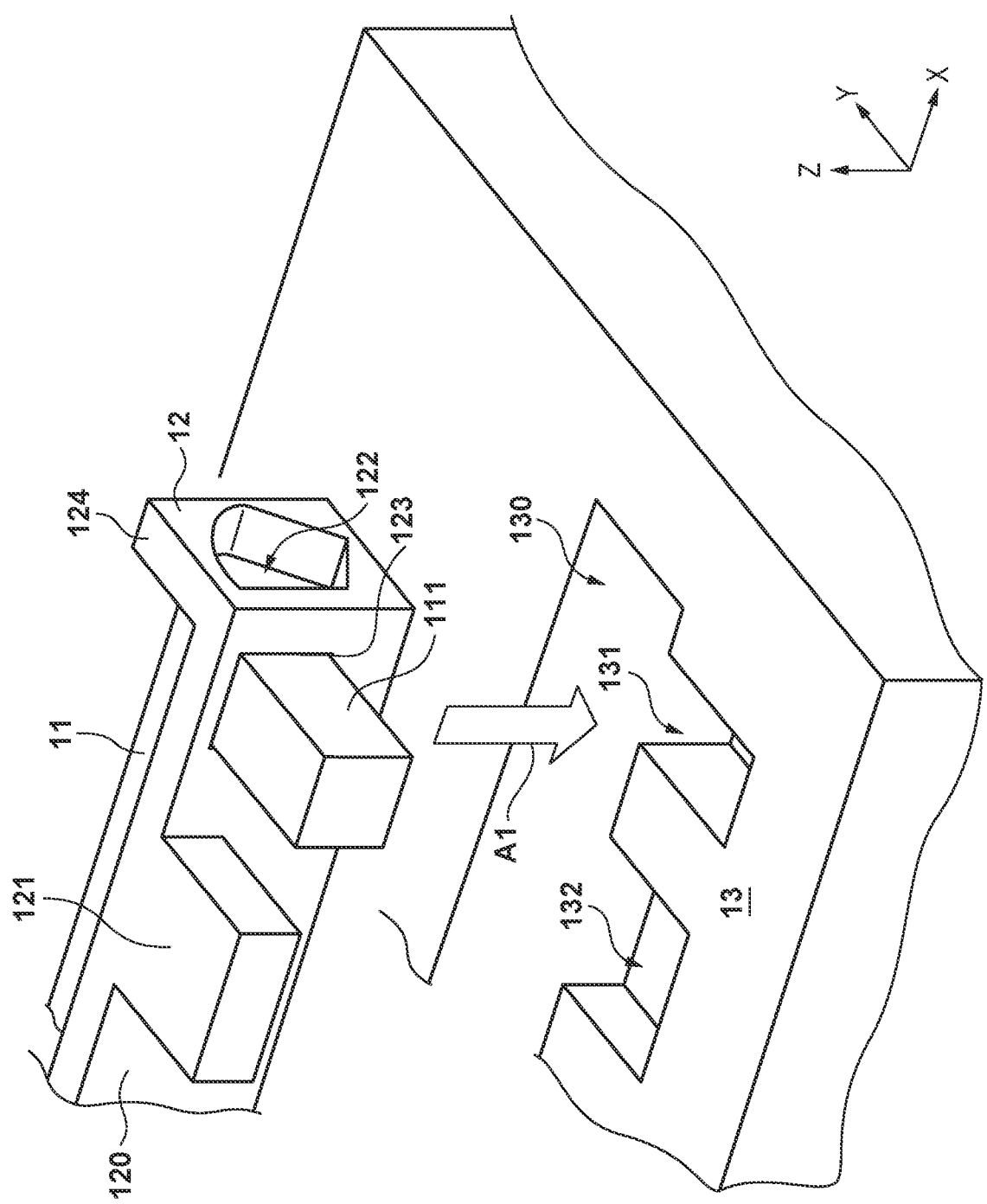
FIG. 5 is a perspective view for explaining a state in which the covering member that fixes the light guide is assembled to a housing.

A state in which the covering member 12 that fixes the light guide 11 is assembled to the housing 13 will be described below with reference to FIG. 5. The protruded portion 111 of the light guide 11 can be inserted into the opening 123 of the covering member 12. By inserting the protruded portion 111 into the opening 123, as shown in FIG. 5, the light guide 11 is assembled and fixed to the covering member 12.

At the time of assembly, an operator (or a manipulator/end effector) can hold the holding portion 121, thereby improving the operation efficiency. Note that 'hold' enables the operator to move an object to a desirable direction, and can be expressed as 'pinch' or 'have'. Also, two or more holding portions 121 are preferably provided at separated positions (see FIG. 1), thereby making it possible to hold the covering member 12 in a stable posture. In addition, the holding portion 121 preferably includes a pair of upper and lower or left and right planes, thereby allowing the operator to readily hold the covering member 12 and implementing assembly more accurately.

As described above, no protruded portion 111 is provided in the other end portion (the end portion on the −X direction side) of the light guide 11 on the side of the light source unit 14B. Although not shown in FIG. 5, a holding portion that can hold the light guide 11 is provided in the other end portion (the end portion on the −X direction side) of the covering member 12 on the side of the light source unit 14B, instead of the opening 123. For example, two arm portions for clamping the light guide 11 extend from the main body portion 120 in the +Y direction, thereby forming the holding portion. With this arrangement, if the light guide 11 thermally expands in the X direction due to heat, the thermally expanded portion has a shape to slide with respect to the holding portion, and it is thus possible to prevent a stress from being generated in the light guide 11.

Referring back to FIG. 5, the covering member 12 to which the light guide 11 is assembled is assembled to or inserted into the housing 13 in a direction indicated by an arrow A1, and is fixed to the housing 13.

The housing 13 includes a containing portion 130 and receiving portions 131 and 132. The containing portion 130 is a groove portion formed in the X direction, and can contain the covering member 12 together with the light guide 11.

The receiving portion 131 is provided in the −Y direction from the containing portion 130, has a shape open in the Z direction, and can receive the protruded portion 111 of the light guide 11. This allows the protruded portion 111 to be engaged with the receiving portion 131.

Furthermore, the receiving portion 132 is provided in the −Y direction from the containing portion 130 at a position (a position on the −X direction side) inside the receiving portion 131, has a shape open in the Z direction, and can receive the holding portion 121 of the covering member 12. This allows the holding portion 121 to be engaged with the receiving portion 132.

According to this embodiment, when the receiving portions 131 and 132 have such shapes, the covering member 12 to which the light guide 11 is assembled can be assembled to or inserted into the housing 13 in the Z direction, thereby making it easy to arrange the light guide 11. Note that by setting the width (the width in the X direction) of the receiving portion 131 larger than the width (the width in the X direction) of the protruded portion 111, it is possible to readily assemble the covering member 12 to the housing 13.

The receiving portions 131 and 132 may be referred to as engaged portions or the like. In this embodiment, the receiving portions 131 and 132 have the shapes open in the Z direction. However, as another embodiment, the receiving portions 131 and 132 may have horizontal hole shapes formed in the Y direction or may be though holes.

In the above structure of the housing 13, when assembling the covering member 12 to the housing 13, the protruded portion 111 and the holding portion 121 are contained in the receiving portions 131 and 132, respectively.

Referring back to FIG. 1, the protruded portion 111 of the light guide 11 is located, in the X direction, outside a region E where the line sensor 3 is extended. That is, the protruded portion 111 is located not to overlap the region E when viewed in the Y direction. This region E corresponds to a region where the reading apparatus RO can read the reading target object. As described above, in this embodiment, the protruded portion 111 protrudes from the light diffusing surface F3 of the light guide 11 (see FIG. 3). Therefore, an amount of light emitted from the light emitting surface F2 may become nonuniform near the protruded portion 111. According to this embodiment, by providing the protruded portion 111 outside the region E in the X direction, the amount of emitted light in the region E can be uniformed.

Note that the region E does not necessarily correspond to the full length of the line sensor 3 in the X direction. For example, if a dummy sensor is arranged in each end portion of the line sensor 3, a region between the dummy sensors is set as the region E.

According to this embodiment, the protruded portion 111 of the light guide 11 is inserted into the opening 123 of the covering member 12, and engaged with the receiving portion 131 of the housing 13. When the protruded portion 111 is inserted into the opening 123, the positional shift in the X direction between the light guide 11 and the covering member 12 is suppressed. Furthermore, when the protruded portion 111 is engaged with the receiving portion 131, the positional shift in the X direction between the light guide 11 and the housing 13 is suppressed. Accordingly, the positional shift in the X direction between the covering member 12 and the housing 13 is also suppressed.

The protruded portion 111 is provided in one end portion (an end portion on the +Y direction side) of the light guide 11 on the side of the light source unit 14A. This suppresses a variation in distance between the light guide 11 and the light source unit 14A that is caused by thermal expansion of the light guide 11, thereby making it possible to maintain the reading accuracy of the reading apparatus RO. For example, when L represents the full length of the light guide 11, the distance from the end of the light guide 11 on the side of the light source unit 14A to the protruded portion 111 is set to L/5 or less and, more preferably, L/10 or less.

In this embodiment, the holding portion 121 is engaged with the receiving portion 132. This suppresses the positional shift in the X direction between the covering member 12 and the housing 13 more appropriately.

Furthermore, in this embodiment, as is apparent from FIG. 2, the covering member 12 is contained and engaged with the containing portion 130 appropriately together with the light guide 11. This suppresses the positional shifts of the light guide 11 and the covering member 12 in the Y direction with respect to the housing 13. In this embodiment, the protruded portion 111 protruding from the main body portion 110 of the light guide 11 is inserted into the opening 123 of the covering member 12, and the distal end of the protruded portion 111 abuts against the housing 13. This suppresses the positional shift of the light guide 11 in the Y direction with respect to the housing 13 more appropriately.

According to this embodiment, it is possible to appropriately suppress the relative positional shifts among the light guide 11, the covering member 12, and the housing 13 with a relatively simple arrangement.

The present invention is not limited to the above-exemplified form, and changes can be made without departing from the spirit and scope of the present invention.

For example, the above embodiment has exemplified the component having a shape of a quadrangular prism as the protruded portion 111. However, the protruded portion 111 is not limited to this shape, and another shape such as a shape of a circular prism may be adopted. In this case, the opening 123 into which the protruded portion 111 is inserted and the receiving portion 131 with which the protruded portion 111 is engaged are provided to correspond to the shape of the protruded portion 111. The same applies to the shape of the holding portion 121.

Furthermore, the above embodiment has exemplified the arrangement of the illumination apparatus 1 included in the reading apparatus RO. This arrangement is applicable to another apparatus having an illumination function supplementarily.

Figure 6:
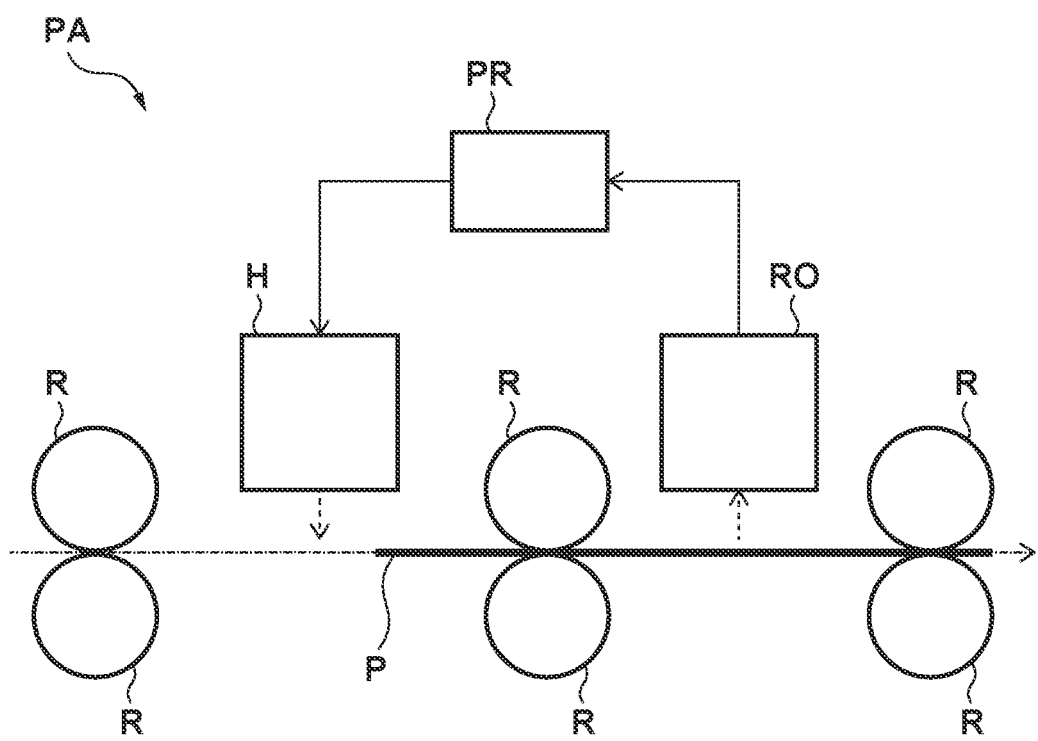
FIG. 6 is a sectional view for explaining an example of the structure of a printing apparatus.

FIG. 6 shows an example of the arrangement of a printing apparatus PA as an application example of the reading apparatus RO including the above-described illumination apparatus 1. The printing apparatus PA can adopt a known printing method such as an inkjet method or an electrophotographic method. The printing apparatus PA may be referred to as an image forming apparatus or a printing apparatus including an inkjet printer, a laser beam printer, a copying machine, and an MFP (Multi-Function Printer). The printing apparatus PA includes a printing unit H, a processor PR, and a plurality of conveyance rollers R in addition to the reading apparatus RO.

As the printing unit H, for example, a head for discharging a liquid such as ink is used. The printing unit H is driven by an electrical signal based on printing data, and prints an image on a printing medium P by discharging the liquid onto the printing medium P. The processor PR outputs an electrical signal based on printing data to the printing unit H, thereby driving the printing unit H. The conveyance rollers R convey the printing medium P based on a driving signal from the processor PR. In this embodiment, the conveyance rollers R convey the printing medium P, on which the image is printed by the printing unit H, toward the reading apparatus RO in a direction indicated by a one-dot dashed line in FIG. 6.

The reading apparatus RO is detachably contained in the printing apparatus PA, and reads the image printed on the printing medium P by the printing unit H. The processor PR receives a reading result of the reading apparatus RO. Based on the reading result, for example, the processor PR can correct the driving force (for example, the discharge amount of the liquid) of the printing unit H, and also notify the user that it is necessary to re-execute printing.

In addition, the illumination apparatus 1 is applicable to a reading apparatus having no printing function, such as a document reader or a flatbed scanner. For example, the illumination apparatus 1 can be widely applied to various apparatuses aiming at illumination/lighting, such as a table lamp or an illumination apparatus provided on the ceiling of a room. Light emitting elements other than LEDs may be used as the light source units 14A and 14B, and one of them may be omitted.

Moreover, the individual terms described in this specification are merely used to explain the present invention, and the present invention is, of course, not limited to the strict meanings of these terms, and can include their equivalents. For example, an assembly/unit/module/device can be used instead of the term "apparatus" and vice versa.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-172406, filed on Sep. 7, 2017, and No. 2018-160580, filed on Aug. 29, 2018, which are hereby incorporated by reference herein in their entirety.

What is claimed is:

1. An illumination apparatus comprising:
a rod-shaped light guide configured to guide light from a light source unit and emit the light from a light emitting surface;
a covering member configured to contain the light guide; and
a housing configured to contain the light source unit, the light guide, and the covering member,
wherein the light guide includes a protruding portion,
wherein the covering member includes an opening,
wherein the housing includes a receiving portion configured to receive the protruding portion of the light guide,
wherein the protruding portion of the light guide is engaged with the receiving portion of the housing via the opening of the covering member so as to suppress a shift in a longitudinal direction, and
wherein the receiving portion has a shape open in a direction intersecting both the longitudinal direction and a protruding direction of the protruding portion.

2. The apparatus according to claim 1, wherein the protruding portion is provided in one of two end portions of the light guide in the longitudinal direction that is closer to the light source unit.

3. The apparatus according to claim 2, further comprising a substrate that is extended in the longitudinal direction and in which the light source unit is implemented as a first light source unit in one end portion and a second light source unit is implemented in the other end portion,
wherein the substrate is fixed to the housing so that the light guide is located between the first light source unit and the second light source unit.

4. A reading apparatus comprising:
the illumination apparatus defined in claim 1;
a rod lens array; and
a line sensor.

5. A printing apparatus comprising:
the reading apparatus defined in claim 4 and configured to read a medium; a printing unit configured to execute printing on the medium based on a reading result of the reading apparatus; and
a conveyance unit configured to convey the medium.

* * * * *